United States Patent [19]
Schultz

[11] Patent Number: 6,029,162
[45] Date of Patent: Feb. 22, 2000

[54] GRAPH PATH DERIVATION USING FOURTH GENERATION STRUCTURED QUERY LANGUAGE

[75] Inventor: Thomas Alan Schultz, Naperville, Ill.

[73] Assignee: Lucent Technologies, Inc., Murray Hill, N.J.

[21] Appl. No.: 09/024,411

[22] Filed: Feb. 17, 1998

Related U.S. Application Data

[63] Continuation-in-part of application No. 08/790,302, Jan. 31, 1997, Pat. No. 5,819,257.

[51] Int. Cl.[7] .................................................. G06F 17/30
[52] U.S. Cl. ...................... 707/2; 707/3; 707/4; 707/100
[58] Field of Search ................................ 707/2, 3, 4, 100

[56] References Cited

U.S. PATENT DOCUMENTS

| | | | |
|---|---|---|---|
| 4,706,080 | 11/1987 | Sincoskie | 340/825.02 |
| 5,201,046 | 4/1993 | Goldberg et al. | 707/100 |
| 5,659,725 | 8/1997 | Levy et al. | 707/3 |
| 5,701,454 | 12/1997 | Bhargava et al. | 707/2 |
| 5,855,012 | 12/1998 | Bhargava et al. | 707/2 |
| 5,875,447 | 2/1999 | Goel et al. | 707/4 |

OTHER PUBLICATIONS

Libkin, L., et al., "Incremental recomputation of recusive queries with nested sets and aggregate functions", Database Programming Languages, DBPL–6 Proceedings, Aug. 1997, Abstract Only.

Dar, S. et al., "Extending SQL with generalized transitive closure", IEEE Transactions on knowledge and Data Engineering, Oct. 1993, Abstract Only.

Eder, J., "General Transitive closures and aggregate functions", DEXA 91 Database and Expert Systems Applications, Aug. 1991, abstract Only.

Eder, J., "General transitive closure of relations containing duplicates", Information Systems, vol. 15, No. 3, 1990, Abstract Only.

Eder, J., "Extending SQL with general transitive closure and extreme value selections", IEEE Transactions on knowledge and data Engineering, vol.2, No.4, Dec. 1990, abstract Only.

*Primary Examiner*—Jean R. Homere

[57] ABSTRACT

Any existing transitive closure in a database can be found using a method based on standard 4th Generation Structured Query Language (SQL) without non-standard extensions to perform recursion analysis. Once a transitive closure table is compiled, SQL and the transitive closure table can be used to calculate critical path lengths, sums, averages, or other values, through a directed acyclical graph. Since this method uses instructions that are entirely within standard 4GL SQL, it can be used over multiple platforms as long as the platforms are 4GL SQL compliant.

5 Claims, 5 Drawing Sheets

FIG. 1
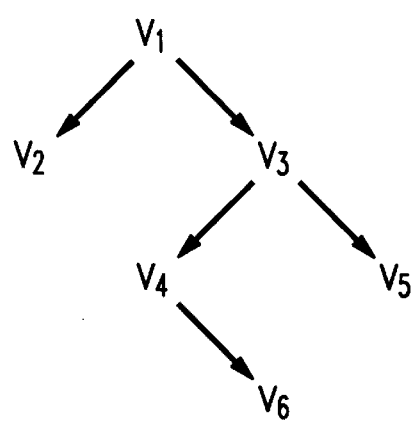
FIG. 2
$$\begin{bmatrix} 0 & 1 & 1 & 0 & 0 & 0 \\ 0 & 0 & 0 & 0 & 0 & 0 \\ 0 & 0 & 0 & 1 & 1 & 0 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$
FIG. 3
$$\begin{bmatrix} 0 & 1 & 1 & 1 & 1 \\ 0 & 0 & 0 & 0 & 0 \\ 0 & 0 & 0 & 1 & 1 \\ 0 & 0 & 0 & 0 & 1 \\ 0 & 0 & 0 & 0 & 0 \\ 0 & 0 & 0 & 0 & 0 \end{bmatrix}$$
FIG. 4
$$\begin{bmatrix} 1 & 1 & 1 & 1 & 1 \\ 0 & 1 & 0 & 0 & 0 \\ 0 & 0 & 1 & 1 & 1 \\ 0 & 0 & 0 & 1 & 0 \\ 0 & 0 & 0 & 0 & 1 \\ 0 & 0 & 0 & 0 & 1 \end{bmatrix}$$
FIG. 5
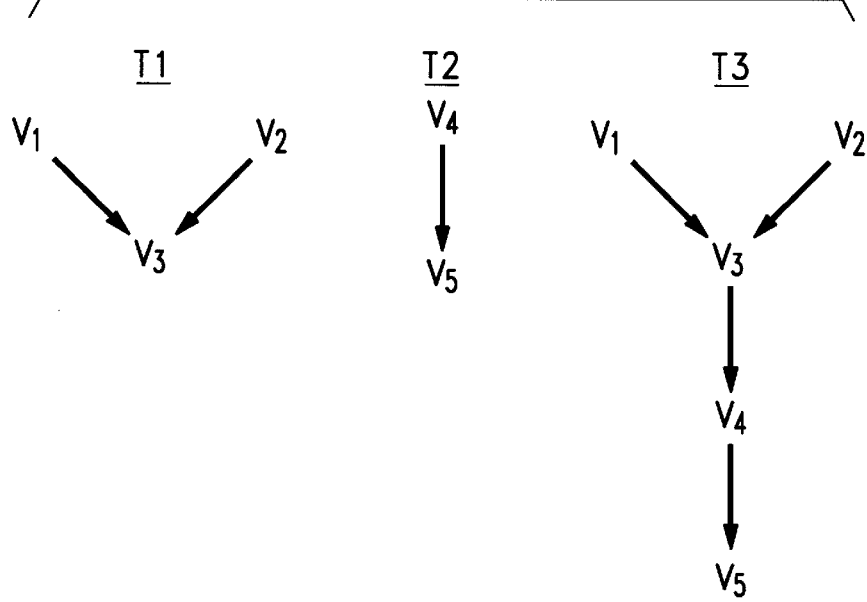

FIG. 11

CITY_PATH

| SOURCE | DESTINATION | PATH | COST |
|---|---|---|---|
| NEW_YORK | NEW_YORK | NEW_YORK | 0 |
| ATLANTA | ATLANTA | ATLANTA | 0 |
| CHICAGO | CHICAGO | CHICAGO | 0 |
| DALLAS | DALLAS | DALLAS | 0 |
| DENVER | DENVER | DENVER | 0 |
| SAN_FRANCISCO | SAN_FRANCISCO | SAN_FRANCISCO | 0 |
| LOS_ANGELES | LOS_ANGELES | LOS_ANGELES | 0 |
| NEW_YORK | CHICAGO | NEW_YORK/CHICAGO | 13 |
| NEW_YORK | ATLANTA | NEW_YORK/ATLANTA | 22 |
| CHICAGO | SAN_FRANCISCO | CHICAGO/SAN_FRANCISCO | 80 |
| NEW_YORK | SAN_FRANCISCO | NEW_YORK/CHICAGO/SAN_FRANCISCO | 93 |
| CHICAGO | DENVER | CHICAGO/DENVER | 60 |
| NEW_YORK | DENVER | NEW_YORK/CHICAGO/DENVER | 73 |
| CHICAGO | DALLAS | CHICAGO/DALLAS | 40 |
| NEW_YORK | DALLAS | NEW_YORK/CHICAGO/DALLAS | 53 |
| CHICAGO | ATLANTA | CHICAGO/ATLANTA | 12 |
| NEW_YORK | ATLANTA | NEW_YORK/CHICAGO/ATLANTA | 25 |
| ATLANTA | DALLAS | ATLANTA/DALLAS | 26 |
| NEW_YORK | DALLAS | NEW_YORK/ATLANTA/DALLAS | 48 |
| CHICAGO | DALLAS | CHICAGO/ATLANTA/DALLAS | 38 |
| NEW_YORK | DALLAS | NEW_YORK/CHICAGO/ATLANTA/DALLAS | 51 |
| DALLAS | DENVER | DALLAS/DENVER | 23 |
| CHICAGO | DENVER | CHICAGO/DALLAS/DENVER | 63 |

FIG. 12

CITY_PATH

| SOURCE | DESTINATION | PATH | COST |
|---|---|---|---|
| NEW_YORK | DENVER | NEW_YORK/CHICAGO/DALLAS/DENVER | 76 |
| ATLANTA | DENVER | ATLANTA/DALLAS/DENVER | 49 |
| NEW_YORK | DENVER | NEW_YORK/ATLANTA/DALLAS/DENVER | 71 |
| CHICAGO | DENVER | CHICAGO/ATLANTA/DALLAS/DENVER | 61 |
| NEW_YORK | DENVER | NEW_YORK/CHICAGO/ATLANTA/DALLAS/DENVER | 74 |
| DENVER | SAN_FRANCISCO | DENVER/SAN_FRANCISCO | 15 |
| CHICAGO | SAN_FRANCISCO | CHICAGO/DENVER/SAN_FRANCISCO | 75 |
| NEW_YORK | SAN_FRANCISCO | NEW_YORK/CHICAGO/DENVER/SAN_FRANCISCO | 88 |
| DALLAS | SAN_FRANCISCO | DALLAS/DENVER/SAN_FRANCISCO | 38 |
| CHICAGO | SAN_FRANCISCO | CHICAGO/DALLAS/DENVER/SAN_FRANCISCO | 78 |
| NEW_YORK | SAN_FRANCISCO | NEW_YORK/CHICAGO/DALLAS/DENVER/SAN_FRANCISCO | 91 |
| ATLANTA | SAN_FRANCISCO | ATLANTA/DALLAS/DENVER/SAN_FRANCISCO | 64 |
| NEW_YORK | SAN_FRANCISCO | NEW_YORK/ATLANTA/DALLAS/DENVER/SAN_FRANCISCO | 86 |
| CHICAGO | SAN_FRANCISCO | CHICAGO/ATLANTA/DALLAS/DENVER/SAN_FRANCISCO | 76 |
| NEW_YORK | SAN_FRANCISCO | NEW_YORK/CHICAGO/ATLANTA/DALLAS/DENVER/SAN_FRANCISCO | 89 |
| DENVER | LOS_ANGELES | DENVER/LOS_ANGELES | 21 |
| CHICAGO | LOS_ANGELES | CHICAGO/DENVER/LOS_ANGELES | 81 |
| NEW_YORK | LOS_ANGELES | NEW_YORK/CHICAGO/DENVER/LOS_ANGELES | 94 |
| DALLAS | LOS_ANGELES | DALLAS/DENVER/LOS_ANGELES | 44 |
| CHICAGO | LOS_ANGELES | CHICAGO/DALLAS/DENVER/LOS_ANGELES | 84 |
| NEW_YORK | LOS_ANGELES | NEW_YORK/CHICAGO/DALLAS/DENVER/LOS_ANGELES | 97 |
| ATLANTA | LOS_ANGELES | ATLANTA/DALLAS/DENVER/LOS_ANGELES | 70 |
| NEW_YORK | LOS_ANGELES | NEW_YORK/ATLANTA/DALLAS/DENVER/LOS_ANGELES | 92 |
| CHICAGO | LOS_ANGELES | CHICAGO/ATLANTA/DALLAS/DENVER/LOS_ANGELES | 82 |
| NEW_YORK | LOS_ANGELES | NEW_YORK/CHICAGO/ATLANTA/DALLAS/DENVER/LOS_ANGELES | 95 |
| SAN_FRANCISCO | LOS_ANGELES | SAN_FRANCISCO/LOS_ANGELES | 8 |

FIG. 13

CITY_PATH

| SOURCE | DESTINATION | PATH | COST |
|---|---|---|---|
| CHICAGO | LOS_ANGELES | CHICAGO/SAN_FRANCISCO/LOS_ANGELES | 88 |
| NEW_YORK | LOS_ANGELES | NEW_YORK/CHICAGO/SAN_FRANCISCO/LOS_ANGELES | 101 |
| DENVER | LOS_ANGELES | DENVER/SAN_FRANCISCO/LOS_ANGELES | 23 |
| CHICAGO | LOS_ANGELES | CHICAGO/DENVER/SAN_FRANCISCO/LOS_ANGELES | 83 |
| NEW_YORK | LOS_ANGELES | NEW_YORK/CHICAGO/DENVER/SAN_FRANCISCO/ LOS_ANGELES | 96 |
| DALLAS | LOS_ANGELES | DALLAS/DENVER/SAN_FRANCISCO/LOS_ANGELES | 46 |
| CHICAGO | LOS_ANGELES | CHICAGO/DALLAS/DENVER/SAN_FRANCISCO/ LOS_ANGELES | 86 |
| NEW_YORK | LOS_ANGELES | NEW_YORK/CHICAGO/DALLAS/DENVER/ SAN_FRANCISCO/LOS_ANGELES | 99 |
| ATLANTA | LOS_ANGELES | ATLANTA/DALLAS/DENVER/SAN_FRANCISCO/ LOS_ANGELES | 72 |
| NEW_YORK | LOS_ANGELES | NEW_YORK/ATLANTA/DALLAS/DENVER/ SAN_FRANCISCO/LOS_ANGELES | 94 |
| CHICAGO | LOS_ANGELES | CHICAGO/ATLANTA/DALLAS/DENVER SAN_FRANCISCO/LOS_ANGELES | 84 |
| NEW_YORK | LOS_ANGELES | NEW_YORK/CHICAGO/ATLANTA/DALLAS/DENVER/ SAN_FRANCISCO/LOS_ANGELES | 97 |

GRAPH PATH DERIVATION USING FOURTH GENERATION STRUCTURED QUERY LANGUAGE

This is a continuation-in-part of U.S. patent application Ser. No.: 08/790,302, filed Jan. 31, 1997, now U.S. Pat. No. 5,819,257 for: "Process for Providing Transitive Closure Using Fourth Generation Structured Query Language (SQL)" assigned to Lucent Technologies, Inc.

TECHNICAL FIELD

The invention generally relates to computer relational database systems, methods and systems for representing and retrieving data from relational databases and in particular to a method and system for calculating actual paths and path length through a graph representable using tables.

DESCRIPTION OF THE PRIOR ART

Many computer software problems today can be modeled as graph problems. One of the classical issues associated with graph problems involves determining the existence of a path between all (source, destination) vertex tuples in a graph. This is the so-called transitive closure problem. There are a number of classical approaches that involve computing the transitive closure of a graph procedurally from a list of graph edges. A number of research efforts have described extended versions of SQL that include operators that execute such procedures such as U.S. Pat. No. 5,201,046 to Goldberg et al.; Extending SQL with Generalized Transitive Closure Functionality, by S. Dar and R. Agrawal published in IEEE Transactions on Knowledge and Data Engineering, Vol. 5, No. 5, October 1993; Extending SQL with Generalized Transitive Closure and Extreme Value Selections, by J. Eder published by IEEE Transactions on Knowledge and Data Engineering, Vol. 2, No. 4, December 1990; and Implementing Generalized Transitive Closure in the Paradise Geographical Information System, by B. Nar published as TR 1272, University of Wisconsin, Computer Science Department, Madison Wis., June 1995.

Deriving the transitive closure for a given a set of vertices $\{V_1 \ldots V_n\}$ comprising the graph, G, is the transitive closure problem. The solution of the transitive closure problem refers to determining for every pair of vertices $(V_i, V_j)$ in G the existence of a path from $V_i$ to $V_j$. Determining the transitive closure of a graph can be part of many real computer database problems. For example, airline routes and fares between two distant cities can be represented graphically as a hierarchical or directed acyclic graph. Between the two distant cities there might be several other cities through which a plane might stop. The several possible routes linking a traveler's origin and destination that go through several different cities constitute several different routes and several different fares a traveler might take. Manually determining the shortest and/or the least costly route between the origin and destination can be a tedious undertaking. The ability to perform this query requires computing a transitive closure, i.e. solving the transitive closure problem.

Consider the tree T as shown in FIG. 1. Tree T can be represented by a binary relation of edges as depicted in the following adjacency matrix R shown in FIG. 2. The columns and rows in the matrix represent vertices $\{V_1, \ldots V_6\}$. A value of 1 in row i column j represents the existence of an edge from $V_i$ to $V_j$. The existence of a path between any two vertices $V_i$ and $V_j$ in T can be represented by the following transitive closure matrix $R^+$, shown in FIG. 3. In FIG. 3 a value of 1 in row i column j represents the existence of a path from $V_i$ to $V_j$. If an implicit path from any vertex $V_i$ to itself is assumed, then the following matrix, $R^*$, shown in FIG. 4, represents the reflexive transitive closure of T.

The Warshall procedure is a classical process for computing the transitive closure of a directed graph of N vertices. The Warshall procedure is:

```
procedure Warshall (var edge: array [1..N, 1..N] of boolean);
var i, j, k: graphindex,
begin
    for i := 1 to N do
        for j := 1 to N do
            if edge[j,i] then
                for k := 1 to N do
                    if edge[i,k] then
                        edge∂j,k] := true
    end
end;
```

Note that the procedure of Warshall is procedural and executes in $O(N^3)$ in generating the existence of all paths. Generally speaking, most real-world applications want answers to specific questions, such as "tell me all descendants of a particular vertex $V_i$." The $O(N^3)$ Warshall procedure is a wasteful overkill, i.e. it uses a large amount of processor time, in order to answer any specific question.

Instead of representing graph edges as a 2-dimensional array as in the Warshall procedure, a relational database procedure approach involves representing a directed graph as a set of parent-child edges in a relational database table and then using a powerful declarative programming language such as SQL in a recursive algorithm to navigate through the table. Table 1 depicts the edges in tree T shown in FIG. 1.

TABLE 1

| EDGE | |
| --- | --- |
| Parent | Child |
| $V_1$ | $V_2$ |
| $V_1$ | $V_3$ |
| $V_3$ | $V_4$ |
| $V_3$ | $V_5$ |
| $V_4$ | $V_6$ |

According to this database approach, the following is pseudo-code of a typical 3GL SQL function to compute the descendants of a vertex, $V_i$, from Table 1, the edge table.

```
find_descendants(Vertex V_i) {
EXEC SQL SELECT child INTO child FROM edge WHERE parent = V_i;
EXEC SQL BEGIN;
    puts(child);
    find_descendants(child);
EXEC SQL END;
}
```

This function according to this database approach is elegant and concise, but solves only one specific query involving all descendants. It does not provide the ability to ask other questions. For example, if the vertices represented tasks in a project plan and contained dates representing when each task was expected to be complete, a manager might want to pose the question "tell me all tasks that are late". Since the above function is written in 3GL, any modifications will require a recompilation of the function.

An equivalent database approach using standard 4GL SQL cannot be implemented. The reason for this is because standard 4GL SQL does not include recursion operations. Some non-standard extension is then sometimes used to provided the recursion. One such non-standard approach is shown in U.S. Pat. No. 5,201,046 issued Apr. 6, 1993 to R. Goldberg et al. mentioned above. Another example of such non-standard SQL extensions is known from the commercial relational database system of Oracle Corporation which has a "connected by" recursive operator.

A non-recursive 4GL SQL solution can be implemented using an edge table, provided the depth of the directed graph is known in advance. The following non-recursive 4GL SQL statement computes the set of descendants of a vertex, $V_i$, from the edge table shown in table 1.

```
select child
  from edge
  where parent = Vi
union select level2.child
  from edge level1, edge level2
  where level1.parent =Vi
  and level2.parent = level1.child
union select level3.child
  from edge level1, edge level2, edge level3
  where level1.parent =Vi
  and level2.parent = level1.child
  and level3.parent = level2.child
```

Note the above presented algorithm has hard-coded knowledge about the fact that Tree T shown in FIG. 1 does not descend beyond 3 levels. An increase or decrease in the number of levels in T potentially breaks the algorithm.

The inventor has shown in the above-identified parent application that a method for determining a transitive closure between two vertices of a tree graph in standard SQL includes the steps of determining all vertices of the tree graph, determining an edge table from all of the vertices, deriving a path table from the vertices and the edge table, and from the path table determining at least one transitive closure path between the two if such transitive closure exists.

The inventor has also shown in the above-identified parent application that determining transitive closure between two vertices of a directed acyclic graph in standard SQL includes the steps of determining all vertices of the directed acyclic graph, determining an edge table from all of the vertices, deriving a path table from the vertex and the edge tables, and from the path table determining at least one transitive closure path between the two if such transitive closure exists.

If transitive closure exists, an object of the present invention is to derive actual paths and path length using standard Structured Query Language.

SUMMARY OF THE INVENTION

A method of calculating critical paths through a graph that can be represented by tables is comprised of the steps of: tabulating (or compiling) vertices in a graph; tabulating graphical edges linking vertices in the graph. After the vertex table and the edge tables are compiled, a transitive closure table must be compiled that shows all of the routes or paths through the graph. The transitive closure table lists all connections between vertices in a graph.

A scalar is associated with each edge in the graph. The scalar might represent a physical quantity such as the edge's physical length or the cost of flying between the two vertices linked by the edge that represent an airline's air service between the two cities From the associated scalars, an SQL program instruction can tabulate the scalars associated with the edges of the graph for which a transitive closure table has been constructed.

BRIEF DESCRIPTION OF THE DRAWINGS

FIG. 1 is a diagram of a tree of verticies

FIG. 2 is an edge table of the tree shown in FIG. 1.

FIG. 3 is a table showing by binary representation the transitive closures between the verticies of the tree shown in FIG. 1.

FIG. 4 is a table showing by binary representation the reflective closures between the verticies of the tree shown in FIG. 1.

FIG. 5 shows another tree of vertices and the creation of an edge in this tree upon adding vertices to this tree.

FIGS. 11, 12, and 13 contain Table 12, which is a transitive closure table for the path graph shown in FIG. 10.

DETAILED DESCRIPTION OF THE PREFERRED EMBODIMENT

Figure 6:
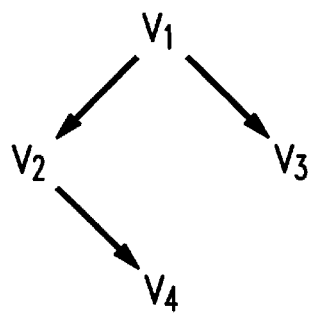
FIG. 6 illustrates a directed graph.

Referring again to FIG. 1, the reflexive transitive closure of tree T according to the present invention can be represented by path Table 2. Each record represents the existence of a path from a source vertex to a destination vertex.

TABLE 2

| PATH | |
| --- | --- |
| Source | Destination |
| $V_1$ | $V_1$ |
| $V_1$ | $V_2$ |
| $V_1$ | $V_3$ |
| $V_1$ | $V_4$ |
| $V_1$ | $V_5$ |
| $V_1$ | $V_6$ |
| $V_2$ | $V_2$ |
| $V_3$ | $V_3$ |
| $V_3$ | $V_4$ |
| $V_3$ | $V_5$ |
| $V_3$ | $V_6$ |
| $V_4$ | $V_4$ |
| $V_4$ | $V_6$ |
| $V_5$ | $V_5$ |
| $V_6$ | $V_6$ |

This innovative representation of reflexive transitive closure permits a standard SQL statement to now be written to derive the descendants of a vertex, $V_i$, as follows.

select destination from path where source=$V_i$

It is noteworthy that the query immediately above does not break if vertices are added to or deleted from the graph. This query has the advantage of always being correct regardless of the number of levels added or deleted.

Having explained the value of representing the reflexive transitive closure of a directed graph as a table in a relational database, it will be appreciated that powerful general queries can be written using standard SQL. Such queries require little or no maintenance because unlike the known methods, hard-coded knowledge about the corresponding graph does not have to be specified in the queries. The challenge that remains, however, is providing the ability to maintain the reflexive transitive closure of such a graph as vertices and edges are added to and deleted from a graph.

The maintenance operations that are commonly necessary include: creating a vertex, creating an edge, deleting an edge, and deleting a vertex. Each of these four maintenance operations will be described below in the context of examining trees and directed acyclic graphs using the path and edge tables, i.e. Tables 2 and 1 respectively.

Creating a New Vertex in a Tree

Creating a new vertex in a tree requires one record inserted into the path table (Table 2) using the instruction:

insert into path (source, destination) values ($V_i$, $V_i$)

Creating an Edge in a Tree

Creating an edge in a tree between vertices and requires an insertion into the edge table (Table 2) as follows.

insert into edge (parent, child) values ($V_i$, $V_j$)

Modifications are also required in the path table (Table 2 reflecting the creation of a new edge. To understand the needed modifications, consider the following example. Suppose there are 2 graph components, T1 and T2, and you wish to connect of T1 to of T2 in order to form T3 as in FIG. 5.

Let $V_i \otimes V_j$ symbolize the change in the path table representing an edge from $V_i$ to $V_j$.

Table 3 shows the corresponding path table for T1 and T2 and the records added to it representing $V_3 \otimes V_4$.

TABLE 3

PATH

| Source | Destination | | |
|--------|-------------|---|---|
| $V_1$ | $V_1$ | | |
| $V_1$ | $V_3$ | | |
| $V_2$ | $V_2$ | $T_1$ | |
| $V_2$ | $V_3$ | | |
| $V_3$ | $V_3$ | | |
| $V_4$ | $V_4$ | | $T_3$ |
| $V_4$ | $V_5$ | $T_2$ | |
| $V_5$ | $V_5$ | | |
| $V_1$ | $V_4$ | | |
| $V_1$ | $V_5$ | | |
| $V_2$ | $V_4$ | $V_3 \otimes V_4$ | |
| $V_2$ | $V_5$ | | |
| $V_3$ | $V_4$ | | |
| $V_3$ | $V_5$ | | |

To compute $V_i \otimes V_j$, every source vertex where $V_i$ is a destination is crossed with every destination vertex where $V_j$ is a source. For the example in FIG. 5, this corresponds to:

$$V_i \otimes V_j = \{V_1, V_2, V_3\} X \{V_4, V_5\} = \{(V_1, V_4), (V_1, V_5), (V_2, V_4), (V_2, V_5), (V_3, V_4), (V_3, V_5)\}$$

which is exactly $V_3 \otimes V_4$ as shown in path table 3. The 4GL SQL required to insert records into the path table (Table 3) corresponding to $V_i \otimes V_j$ is as follows.

```
insert into path
    select p1.source, p2.destination
    from path p1, path p2
    where p1.destination = V₁ and p2.source = Vⱼ
```

Deleting an Edge in a Tree

Deleting an edge in a tree from vertex $V_i$ to vertex $V_j$ requires a delete from the edge table (Table 1) as follows.

delete from edge where parent=$V_i$ and child=$V_j$

The same cross product used in supporting insertion of records into the path table is used to support deletion of records from the path table (Table 3). The corresponding 4GL SQL is as follows.

```
delete from path
    select p1.source, p2.destination
    from path p1, path p2
    where p1.destination = Vᵢ and p2.source = Vⱼ
```

Deleting a Vertex in a Tree

Deleting a vertex in a tree requires record deletes in the edge table (Table 1) as follows.

delete from edge where parent=$V_i$ or child=$V_i$

The records to delete in the path table (Table 3), reflecting the deletion of an edge from $V_i$ to $V_j$, are derived as follows.

```
delete from path
    select p1.source, p2.destination
    from path p1, path p2
    where p1.destination = Vᵢ and p2.source = Vᵢ
```

Directed Acyclic Graphs

It can be shown that attempting to apply the tree maintenance algorithms to a directed acyclic graph in which the path between a source vertex and destination vertex is not unique causes the algorithms to break. For example, consider the directed acyclic graph shown in FIG. 6. If the path table already has unique indices and an attempt is made to create an edge from $V_3$ to $V_4$, the insert will fail because the tuple ($V_3$,$V_4$) already exists for the path $V_1 V_2 V_4$. If the path table is not uniquely indexed, the tuple ($V_1$, $V_4$) will appear twice in the Table 4 path table.

TABLE 4

PATH

| Source | Destination |
|--------|-------------|
| $V_1$ | $V_1$ |
| $V_2$ | $V_2$ |
| $V_3$ | $V_3$ |
| $V_4$ | $V_4$ |
| $V_1$ | $V_2$ |
| $V_1$ | $V_3$ |
| $V_2$ | $V_4$ |
| $V_3$ | $V_4$ |
| $V_1$ | $V_4$ |
| $V_1$ | $V_4$ |

A problem is revealed when attempting to delete the edge from $V_3$ to $V_4$. The delete edge process will delete both ($V_1$, $V_4$) tuples from the path table (Table 4), even though the path $V_1 V_2 V_4$ still exists. To address this problem for directed graphs in which a (source, destination) tuple is not unique, a path_count attribute is used. In the following sections, the use of path_count to support reflexive transitive closure maintenance of directed acyclic graphs is explained.

Creating a New Vertex in a Directed Acyclic Graph

Creating a new vertex in a directed acyclic graph requires one record inserted into the path table (with path_count) as follows.

insert into path (source, destination, path_count) values ($V_i$, $V_i$, 1)

Creating an Edge in a Directed Acyclic Graph

Creating an edge in a directed acyclic graph between vertices $V_i$ and $V_j$ requires an insertion into the edge table as follows.

insert into edge (parent, child) values ($V_i$, $V_j$)

Once the path_count attribute is introduced, one can no longer simply insert records into the path table reflecting the creation of an edge. Instead, an update to increment the path_count of any pre-existing paths must be performed. In creating an edge from vertex $V_i$ to vertex $V_j$, an attempt is made to find all ($V_s$, $V_t$) tuples in the path table where $V_s$ is an ascendant of $V_i$ and $V_t$ is a descendant of $V_j$. For each ($V_s$, $V_t$) tuple found, its current path_count value is incremented by the $path_{13}$ count of ($V_s$,$V_t$) times the path_count of ($V_j$, $V_t$.

The following SQL statements modify the path table in representing the creation of an edge from source vertex $V_i$ to destination vertex $V_j$.

```
update path p1
  from path p2, path p3
  set path_count = p1.path_count + (p2.path_count*p3.path_count)
  where p2.destination = V_i and p1.source = p2.source
  and p3.source = V_j and p1.destination = p3.destination
```

The update handles pre-existing paths. To represent paths that are not pre-existing, inserts must be performed as follows.

```
insert into path
  select p1.source, p2.destination, p1.path_count*p2path_count
  from path p1, path p2
  where p1.destination = V_i and p2.source = V_j
  and not exists (select source, destination from path
    where source = p1.source and destination = p2.destination)
```

Deleting an Edge in a Directed Acyclic Graph

Deleting an edge in a directed acyclic graph from vertex $V_i$ to vertex $V_j$ requires a delete from the edge table as follows.

delete from edge where parent=$V_i$ and child=$V_j$

In deleting an edge from vertex $V_i$ to vertex $V_j$, an attempt is made to find all ($V_s$, $V_t$) tuples in the path table where $V_s$ is an ascendant of $V_i$ and $V_t$ is a descendant of $V_j$. For each ($V_s$, $V_t$) tuple found, its current path_count value is decremented by the path_count of ($V_s$,$V_i$) times the path_count of ($V_j$,$V_t$). The following SQL statements modify the path table in representing the deletion of an edge from source vertex $V_i$ to destination vertex $V_j$.

```
update path p1
  from path p2, path p3
  set path_count = p1.path_count-(p2.path_count*p3.path_count)
  where p2.destination=V_i and p1.source=p2.source
  p3.source = V_j and p1.destination = p3.destination
```

Having decremented the path_count of all affected paths, next all path tuples where path_count=0 are deleted, reflecting the deletion of paths. The 4GL SQL statement to perform this is as follows.

```
delete from path
  where source in (select source from path where destination V_i)
  and destination in (select destination from path where source = V_j)
  and path_count = 0
```

Deleting a Vertex in a Directed Acyclic Graph

Deleting a vertex in a directed acyclic graph requires record deletes in the edge table as follows.

delete from edge where parent=$V_i$ or child=$V_i$

The records to delete in the path table are equivalent to the deleting an edge from $V_i$ to $V_i$ as follows.

```
update path p1
  from path p2, path p3
  set path_count = p1.path_count-(p2.path_count*p3.path_count)
  where p2.destination = V_i and p1.source = p2.source
  and p3.source = V_i and p1.destination = p3.destination
delete from path
  where source in (select source from path where destination = V_i)
  and destination in (select destination from path where source = V_i)
  and path_count = 0
```

Directed Cyclic Graphs

Figure 7:
FIG. 7 illustrates a directed acyclic graph.

It can be shown that the procedures to maintain reflexive transitive closure for directed acyclic graphs break when applied to directed cyclic graphs. Consider the directed graph shown in FIG. 7 which shows a graph with two vertices ($V_1$, $V_2$) and a directed path from $V_1$ to $V_2$. The corresponding path table (Table 5) appears as follows.

TABLE 5

| Source | Destination | Path_count |
|---|---|---|
| $V_1$ | $V_1$ | 1 |
| $V_2$ | $V_2$ | 1 |
| $V_1$ | $V_2$ | 1 |

Figure 8:
FIG. 8 illustrates the directed acyclic graph shown in FIG. 7 after an additional edge has been created.
Figure 9:
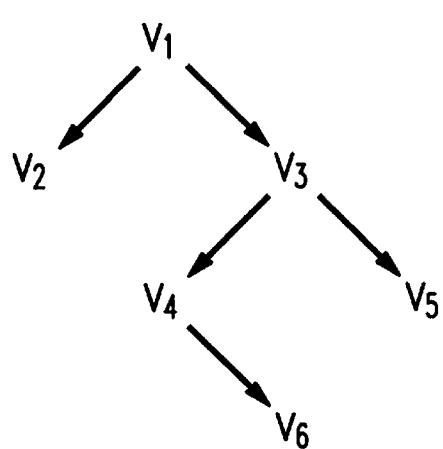
FIG. 9 illustrates a directed cyclic graph.

Now assume an edge from $V_2$ to $V_1$ as shown in FIG. 8 is added to FIG. 9. The path table corresponding to FIG. 8 will appear as follows in Table 6.

TABLE 6

| Source | Destination | Path_count |
|---|---|---|
| $V_1$ | $V_1$ | 2 |
| $V_2$ | $V_2$ | 2 |
| $V_1$ | $V_2$ | 2 |
| $V_2$ | $V_1$ | 4 |

Note that even though the graph in FIG. 9 visually appears symmetric, the path table shows a bias in path_count for tuple ($V_2$, $V_1$). This looks bothersome and, indeed, becomes troublesome if the edge from $V_2$ to $V_1$ is deleted. The corresponding path table (Table 7) will appear as follows.

TABLE 7

| Source | Destination | Path_count |
|--------|-------------|------------|
| $V_1$  | $V_1$       | −2         |
| $V_2$  | $V_2$       | −2         |
| $V_1$  | $V_2$       | −2         |

The expectation was to assume that the operations of creating an edge from $V_2$ to $V_1$ and deleting the edge from $V_2$ to $V_1$ were inverse operations that would leave the path table as shown in Table 5. The fact that the state of the path table is different indicates that the maintenance procedures for directed acyclic graphs don't work for directed cyclic graphs. This is shown as a limit of the present invention in that maintenance of the reflexive transitive closure for directed cyclic graphs is beyond the immediate scope of the present invention.

Automation of Path Table Maintenance

Most commercial relational databases support rules and procedures for automation of path maintenance. Each of the path table SQL statements described previously can be encapsulated into SQL procedures, all in accordance with the present invention. One way to automate is to define database rules that are activated whenever a vertex or edge is added or deleted. The activation of a rule then causes the appropriate path table maintenance procedures to start executing. For instance, if the following rule is defined in a database system, such as Ingres®, the rule is activated into action whenever a record is inserted into the edge table.

create rule edge_insert after insert of edge table execute procedure path_insert (parent=NEW parent, child=NEW child)

with path_insert also defined in a database system (such as Ingres) as follows:

create procedure path_insert (parent integer4, child integer4)

```
BEGIN
    insert into path
        select p1.source, p2.destination
        from path p1, path p2
        where p1.destination=:parent
        and p2.source=:child;
END;
```

Having determined that transitive closure exists and can be determined using SQL, a number of mathematical problems can be modeled and solved graphically. One such problem is the determination of paths between two nodes in a graph. This can be achieved by generating and maintaining the transitive closure of a graph.

Consider the graph shown in FIG. 9. The set of all paths through the graph is listed in Table 8.

TABLE 8

GRAPH PATHS

| Source | Destination vertex | Path |
|--------|--------------------|------|
| $V_1$  | $V_2$              | $V_1/V_2$ |
| $V_1$  | $V_3$              | $V_1/V_3$ |
| $V_1$  | $V_4$              | $V_1/V_3/V_4$ |
| $V_1$  | $V_5$              | $V_1/V_3/V_5$ |
| $V_1$  | $V_6$              | $V_1/V_3/V_4/V_6$ |
| $V_3$  | $V_4$              | $V_3/V_4$ |
| $V_3$  | $V_5$              | $V_3/V_5$ |
| $V_3$  | $V_6$              | $V_3/V_4/V_6$ |
| $V_4$  | $V_6$              | $V_4/V_6$ |

Conventional Relational Solution

The derivation of these paths is typically done using an edge list, Table 9: EDGES, (where an "edge" is a line segment linking two vertices in the tree graph) as follows:

TABLE 9

EDGES

| Parent | Child |
|--------|-------|
| $V_1$  | $V_2$ |
| $V_1$  | $V_3$ |
| $V_3$  | $V_4$ |
| $V_3$  | $V_5$ |
| $V_4$  | $V_6$ |

The following is a typical embedded SQL function to compute all paths from a vertex, $V_i$.

```
Find_path(Vertex V_1, path) {
EXEC SQL SELECT child INTO child FROM edge WHERE parent = V_1;
EXEC SGL BEGIN,
    Find_path(child, path+'/'+child)
EXEC SQL END;
Puts(path);
}
```

The function is elegant and concise, but solves only one specific query involving all paths. It does not provide the ability to ask other questions. For example, if the graph had weighted values on the edges, a typical query desired might be "tell me the critical path (i.e. the least-cost path) from some starting vertex, $V_i$, to some ending vertex, $V_j$. Since the function is written in embedded SQL, any modifications will require a complete recompilation of the function. A pure SQL solution can be implemented, provided the version of SQL used supports recursion, which is not an SQL-standards-defined capability.

Using the aforementioned transitive closure, path length or routes can be determined automatically regardless of modifications to a graph.

Figure 10:
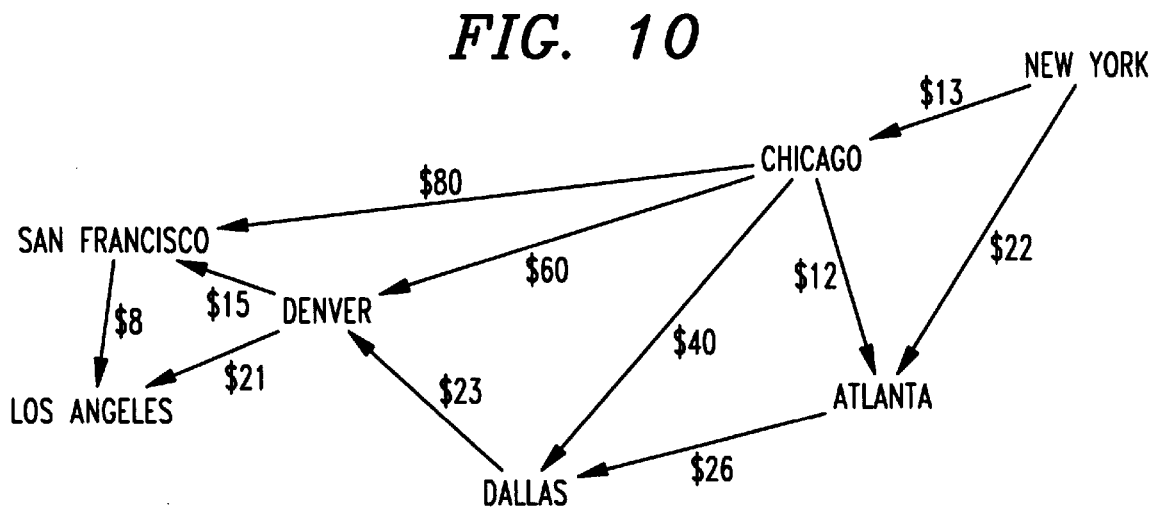
FIG. 10 illustrates a path graph.

Consider the graph shown in FIG. 10.

The graph shown in FIG. 10 represents some cities in the U.S. and air fares from one city to another. By using transitive closure, the least expensive route of traveling from one city to another, which is a classic, critical path problem, is readily solved.

The transitive closure solution uses three tables to represent the graph shown in FIG. 10.

The first step of the method is to compile a list of nodes of the tree graph. Compiling such a list is accomplished using a table. The city table (Table 10) stores all of the cities in the graph.

TABLE 10

| CITY |
|---|
| City |
| New York |
| Chicago |
| Atlanta |
| Dallas |
| Denver |
| San Francisco |
| Los Angeles |

The second step of the method is to compile a list of edges between the nodes of the graph. In addition to a list of edges between nodes, a scalar associated with each edge is compiled as well. Compiling this information is also accomplished using a table. The city_edge table (Table 11) is used to represent all of the lines in the graph connecting a source city to a destination city and the associated cost of traveling along that edge, i.e. between the two cities.

TABLE 11

| CITY_EDGE | | |
|---|---|---|
| Source | Destination | Cost |
| New York | Chicago | $13 |
| New York | Atlanta | $22 |

TABLE 11-continued

| CITY_EDGE | | |
|---|---|---|
| Source | Destination | Cost |
| Chicago | Atlanta | $12 |
| Chicago | San Francisco | $80 |
| Chicago | Denver | $60 |
| Chicago | Dallas | $40 |
| Atlanta | Dallas | $26 |
| Dallas | Denver | $23 |
| Denver | San Francisco | $15 |
| Denver | Los Angeles | $21 |
| San Francisco | Los Angeles | $8 |

The third step is the creation of a transitive closure table, called $city_{13}$ path that includes a "path" of concatenated edges between a "source" vertex and a "destination" vertex, along with the total path length between the source and destination vertex. A transitive closure table can be compiled using the method disclosed in the parent patent application.

The city_path table (Table 12) is the transitive closure of our city graph.

Transitive Closure Maintenance

In order to support maintenance of the city_path table (Table 12) whenever cities or edges are added or removed from the graph shown in FIG. 10, the following SQL code is executed:

```
Insert into city_path (source, destination, path, value) values (V_i,
    V_i, V_i, 0)\p\g
```

Whenever a line is drawn between two cities, $V_I$ and $V_j$ and a corresponding record inserted into the city_edge table, the following SQL code is executed to maintain the city_path transitive closure table (Table 12).

```
Insert into city_path
select p1.source, p2.destination, p1.path + '/' + p2.path, p1.cost + <cost> + p2.cost
from city_path p1, city_path p2
where p1.destination = 'V_i' and p2.source = 'V_j';
```

Whenever a line is erased between two cities, $V_I$ and $V_j$ and a corresponding record deleted from the city_edge table, the following SQL code is executed to maintain the city_path transitive closure table.

```
delete from city_path
where exists (select*from city_path p2 where p2.destination = 'V_I' and city_path.source =
p2.source)
and exists (select*from city_path p3
    where p3.source ='V_j'
    and city_path. destination= p3.destination)
and (locate(varchar(path), '/'+'V_I'+'/') <=length(varchar(path))
    or locate(varchar(path), 'V_I+'/')-1)
and (locate(varchar(path), '/'+'V_j'+'/')<=length(varchar(path))
    or locate(varchar(path), '/'+'V_j') + length('V_j')=length(varchar(path)));
```

Whenever a city is removed from the graph and the corresponding record is deleted from the city table, thefol lowing SQL code is executed to maintain the city_path transitive closure table.

```
delete from city_path
where exists (select*from city_path p2 where p2.destination = 'V_I'
and city_path.source = p2.source)
and exists (select*from city_path p3
where p3.source = 'V_I'
and city_path.destination = p3.destination)
and (locate(varchar(path), '/'+'V_I'+'/') <=length(varchar(path))
    or locate(varchar(path), 'V_I'+'/')= 1)
and (locate(varchar(path), '/'+'V_I'+'/')<=length(varchar(path))
    or locate(varchar(path), '/'+'V_I')+length('V_I')=length(varchar(path)));
```

After executing transitive closure steps 1, 2, 3, and 4 above, the city_path transitive closure table shown in FIGS. 11, 12, and 13 results.

Having derived the city_path transitive closure table above, determining the lowest cost path or route between two cities such as New York and Los Angeles for example, (which are represented as vertices in the graph) can be performed by executing the following SQL query:

```
selectpath, min(cost) as min_cost
from city_path
where source = 'New York'
and destination = 'Los Angeles'
```

Executing this query will produce as an output on the screen the result:

TABLE 14

| Path | Min_cost |
|---|---|
| New_York/Atlanta/Dallas/Denver/Los Angeles | 92 |

Scalars associated with concatenated edges are summed together to find a cumulative path length or route cost. These scalars can be used to represent quantities associated with the edges of the graph.

From the foregoing, determining a critical path through a graph can be automatically solved using a fourth generation structured query language. By representing graphic problems using tables, SQL can be used to tabulate path length, either maximum or minimum, route cost, sum, count, average, or calculating other scalar values if the appropriate scalar is associated with the corresponding path edges.

I claim:

1. A computer-implemented method of aggregating scalars associated with edges in a directed acyclical graph, said method comprising:

i) compiling a list of nodes in said directed acyclical graph;

ii) compiling a list of edges between each node and associating scalar values with each said edge;

iii) generating a transitive closure table using a fourth generation structured query language process;

iii) generating a list of paths formed by concatenated edges between nodes of said graph by inserting into said transitive closure table a path comprised of a source vertex and a destination vertex list of concatenated edges between said source vertex iv) and said destination vertices; aggregating scalars associated with each said edge in each said path from said edge table.

2. The method of claim 1 wherein said step of compiling a list of nodes in said directed cyclical graph is comprised of the step of constructing a table that lists vertices in said graph.

3. The method of claim 1 wherein said step of compiling a list of edges between each node and associating scalar values with each said edge is comprised of the step of constructing a table that lists vertices and graph edges of said directed acyclical graph that exist between vertices.

4. The method of claim 1 wherein said step of aggregating scalars associated with each said edge in each said path from said edge table includes the step of summing said scalars.

5. The method of claim 1 wherein said step of generating a list of paths formed by concatenated edges between nodes of said directed acyclical graph by inserting into said transitive closure table a path comprised of a source vertex and a destination vertex list of concatenated edges between said source vertex and said destination vertices is comprised of the step of creating a table listing edges of said directed acyclical graph that share at least vertex in common.

* * * * *